United States Patent
Oberheide et al.

(10) Patent No.: US 9,282,085 B2
(45) Date of Patent: Mar. 8, 2016

(54) SYSTEM AND METHOD FOR DIGITAL USER AUTHENTICATION

(75) Inventors: Jon Oberheide, Ann Arbor, MI (US); Douglas Song, Ann Arbor, MI (US); Adam Goodman, Bloomfield Hills, MI (US)

(73) Assignee: Duo Security, Inc., Ann Arbor, MI (US)

( * ) Notice: Subject to any disclaimer, the term of this patent is extended or adjusted under 35 U.S.C. 154(b) by 993 days.

(21) Appl. No.: 13/332,027

(22) Filed: Dec. 20, 2011

(65) Prior Publication Data

US 2012/0198228 A1   Aug. 2, 2012

Related U.S. Application Data

(60) Provisional application No. 61/425,119, filed on Dec. 20, 2010.

(51) Int. Cl.
*H04L 29/06*   (2006.01)

(52) U.S. Cl.
CPC ............ *H04L 63/062* (2013.01); *H04L 63/061* (2013.01); *H04L 63/126* (2013.01); *H04L 63/08* (2013.01)

(58) Field of Classification Search
CPC ..... H04L 63/062; H04L 63/064; H04L 63/08; H04L 63/061
USPC .......... 713/150, 155, 156, 170, 171; 380/277, 380/278, 283, 286; 726/2, 27
See application file for complete search history.

(56) References Cited

U.S. PATENT DOCUMENTS

| | | | |
|---|---|---|---|
| 5,838,792 A * | 11/1998 | Ganesan | ........................ 380/282 |
| 5,870,723 A | 2/1999 | Pare et al. | |
| 6,119,096 A | 9/2000 | Mann et al. | |
| 6,694,025 B1 | 2/2004 | Epstein et al. | |
| 6,758,394 B2 | 7/2004 | Maskatiya et al. | |
| 6,823,359 B1 | 11/2004 | Heidingsfeld et al. | |
| 6,934,858 B2 | 8/2005 | Woodhill | |
| 6,956,950 B2 * | 10/2005 | Kausik | ........................ 380/277 |
| 7,096,354 B2 | 8/2006 | Wheeler et al. | |
| 7,447,784 B2 | 11/2008 | Eun | |
| 7,463,637 B2 | 12/2008 | Bou-Diab et al. | |
| 7,526,792 B2 | 4/2009 | Ross | |

(Continued)

OTHER PUBLICATIONS

Symantec, Administration Guide for Symantec TM Endpoint Protection and Symantec Network Access Control, Aug. 1, 2007.

(Continued)

*Primary Examiner* — Saleh Najjar
*Assistant Examiner* — Peiliang Pang
(74) *Attorney, Agent, or Firm* — Jeffrey Schox; Thomas Gwinn

(57) ABSTRACT

A method according to preferred embodiment can include receiving a request at a server from a private key module associated with a first user device; directing a request for a first portion of the private key from the server to a second user device; and in response to a successful user challenge creating a first portion of a digital signature and a second portion of a digital signature at the server. The method of the preferred embodiment can further include combining the first portion of the digital signature and the second portion of the digital signature; and delivering the digital signature to the first user device. The method of the preferred embodiment can function to secure the digital signature process by splitting or dividing the user's private key into two or more portions, each of which require independent authorization from the user in order to create the digital signature.

28 Claims, 5 Drawing Sheets

(56) References Cited

U.S. PATENT DOCUMENTS

| | | |
|---|---|---|
| 7,574,733 B2 | 8/2009 | Woodhill |
| 7,982,595 B2 | 7/2011 | Hanna et al. |
| 8,136,148 B1 | 3/2012 | Chayanam et al. |
| 8,161,527 B2 | 4/2012 | Curren |
| 8,200,980 B1 | 6/2012 | Robinson et al. |
| 8,332,627 B1 | 12/2012 | Matthews et al. |
| 8,335,933 B2 * | 12/2012 | Humphrey et al. ............ 713/193 |
| 8,397,301 B2 | 3/2013 | Hering et al. |
| 8,402,526 B2 | 3/2013 | Ahn |
| 8,458,798 B2 | 6/2013 | Williams et al. |
| 8,495,720 B2 | 7/2013 | Counterman |
| 8,499,339 B2 | 7/2013 | Chao et al. |
| 8,538,028 B2 | 9/2013 | Yeap et al. |
| 8,627,438 B1 | 1/2014 | Bhimanaik |
| 8,646,086 B2 | 2/2014 | Chakra et al. |
| 8,700,729 B2 | 4/2014 | Dua |
| 8,732,475 B2 | 5/2014 | Fahrny et al. |
| 8,732,839 B2 | 5/2014 | Hohl |
| 8,763,077 B2 | 6/2014 | Oberheide et al. |
| 2002/0123967 A1 | 9/2002 | Wang |
| 2003/0115452 A1 * | 6/2003 | Sandhu et al. ................. 713/155 |
| 2003/0126472 A1 | 7/2003 | Banzhof |
| 2003/0147536 A1 * | 8/2003 | Andivahis et al. ............ 380/277 |
| 2004/0064706 A1 * | 4/2004 | Lin et al. ........................ 713/182 |
| 2005/0218215 A1 | 10/2005 | Lauden |
| 2005/0221268 A1 | 10/2005 | Chaar et al. |
| 2005/0268107 A1 | 12/2005 | Harris et al. |
| 2006/0130139 A1 | 6/2006 | Sobel et al. |
| 2006/0165060 A1 | 7/2006 | Dua |
| 2006/0182276 A1 * | 8/2006 | Sandhu et al. ................... 380/44 |
| 2007/0199060 A1 | 8/2007 | Touboul |
| 2007/0250914 A1 * | 10/2007 | Fazal et al. ......................... 726/5 |
| 2007/0284429 A1 | 12/2007 | Beeman |
| 2008/0049642 A1 | 2/2008 | Gudipudi et al. |
| 2009/0055906 A1 * | 2/2009 | von Wendorff ................... 726/5 |
| 2009/0187986 A1 | 7/2009 | Ozeki |
| 2009/0300707 A1 | 12/2009 | Garimella et al. |
| 2010/0042954 A1 | 2/2010 | Rosenblatt et al. |
| 2010/0069104 A1 | 3/2010 | Neil et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0202609 A1 * | 8/2010 | Sandhu et al. ................... 380/44 |
| 2010/0216425 A1 | 8/2010 | Smith |
| 2010/0217986 A1 * | 8/2010 | Schneider ..................... 713/171 |
| 2010/0233996 A1 | 9/2010 | Herz et al. |
| 2010/0330969 A1 | 12/2010 | Kim et al. |
| 2011/0086616 A1 | 4/2011 | Brand et al. |
| 2011/0138469 A1 | 6/2011 | Ye et al. |
| 2011/0197267 A1 | 8/2011 | Gravel et al. |
| 2011/0219449 A1 | 9/2011 | St. Neitzel et al. |
| 2011/0277025 A1 | 11/2011 | Counterman |
| 2011/0302410 A1 | 12/2011 | Clarke et al. |
| 2011/0302630 A1 | 12/2011 | Nair et al. |
| 2012/0090028 A1 | 4/2012 | Lapsley et al. |
| 2012/0096274 A1 * | 4/2012 | Campagna et al. ........... 713/176 |
| 2012/0198050 A1 | 8/2012 | Maki et al. |
| 2012/0216239 A1 | 8/2012 | Yadav et al. |
| 2012/0300931 A1 * | 11/2012 | Ollikainen et al. ........... 380/262 |
| 2013/0042002 A1 | 2/2013 | Cheeniyil et al. |
| 2013/0081101 A1 | 3/2013 | Baer et al. |
| 2013/0097585 A1 | 4/2013 | Jentsch et al. |
| 2013/0110676 A1 | 5/2013 | Kobres |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2014/0047546 A1 | 2/2014 | Sidagni |
| 2014/0188796 A1 | 7/2014 | Fushman et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0351954 A1 | 11/2014 | Brownell et al. |

OTHER PUBLICATIONS

Simske et al., "APEX: Automated Policy Enforcement eXchange", Sep. 21-24, 2010, ACM, pp. 139-142.

* cited by examiner

SYSTEM AND METHOD FOR DIGITAL USER AUTHENTICATION

CLAIM OF PRIORITY

The present application claims priority to U.S. Provisional Patent Application Ser. No. 61/425,119 entitled "Method for Generating a Digital Signature" and filed on 20 Dec. 2010, the entire contents of which are incorporated herein by this reference.

TECHNICAL FIELD

The present invention relates generally to the digital user verification field, and more specifically to a new and useful system and method for generating a digital signature for use in authenticating a user to a third party system.

BACKGROUND AND SUMMARY

The most common form of user-authentication generally relies on shared secrets. Two entities involved in authentication (e.g., a user and a service) must each have knowledge of the shared secret, which is generally a password for the user account. This user-authentication technique has numerous problems in that—for maximum security—a different secret of the user must be maintained for every service, or else access to the secret to one service could be used to impersonate the user for other services. Some form of cryptography can be used to offer some advantages to authentication. One particular class of cryptosystems, known as asymmetric cryptosystems, use a key pair composed of a public key and a private key to authenticate a user. If the user keeps the private key private then only the user will be able to encrypt data that can be decrypted by the public key. However, asymmetric cryptosystem authentication encounters problems when credentials must be revoked or an account updated. Typically shared and private key pairs would have to be updated on all involved systems. Certificate Revocation Lists (CRL) have been used in the past as a way for parties to relay information about the current state of accounts. However, use of CRL has several vulnerabilities that could allow attackers to bypass the system. Thus, there is a need in the digital signature field to create a new and useful system and/or method for generating a digital signature.

Accordingly, one method according to a preferred embodiment can include delivering a public key from a first user device to a third party; requesting a second portion of a private key by the first user device; receiving at the first user device at least a second portion of a digital signature derived from the second portion of the private key in response to a successful user challenge completed on a second user device; and delivering a digital signature from the first user device to the third party.

Another method according preferred embodiment can include receiving a request at a server from a private key module associated with a first user device; directing a request for a first portion of the private key from the server to a second user device; and in response to a successful user challenge creating a first portion of a digital signature and a second portion of a digital signature at the server. The method of the preferred embodiment can further include combining the first portion of the digital signature and the second portion of the digital signature; and delivering the digital signature to the first user device.

The methods of the preferred embodiment can function to secure the digital signature process by splitting or dividing the user's private key into two or more portions, each of which require independent authorization from the user in order to create the digital signature. Other features and advantages of the preferred embodiments are described in detail below with reference to the following figures.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Systems

Figure 1:
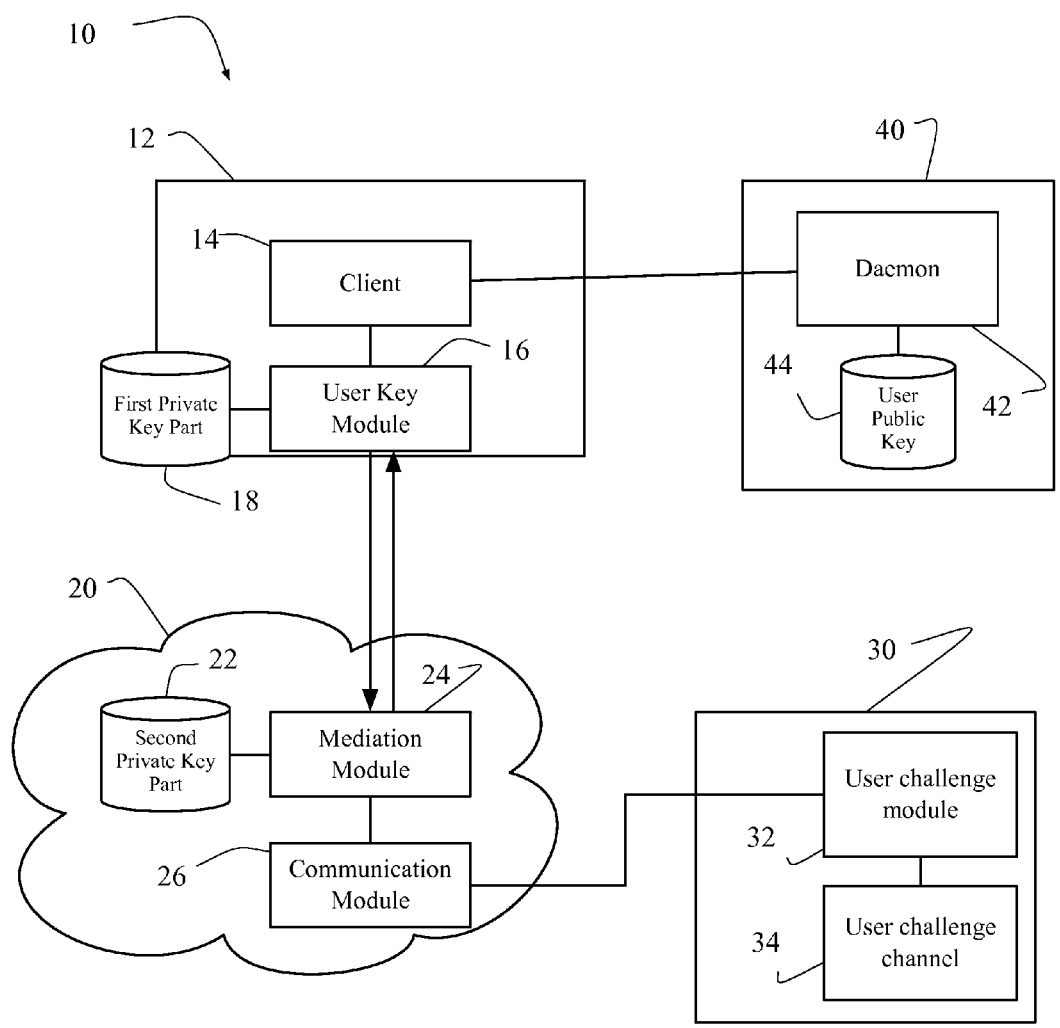
FIG. 1 is a schematic block diagram of a system and/or operating environment of digital user authentication in accordance with one or more example implementations of the present invention.

As shown in FIG. 1, a first embodiment according to the system 10 and/or operating environment of the invention can include a first user device 12, a second user device 30, a remote server 20 connecting the first user device 12 and the second user device 30, and a third party 40 to which a user is attempting to authenticate himself or herself. The first embodiment of the system 10 can generally function to provide a secure and reliable means for authenticating a digital identity of the user to the third party 40 through the use of a user digital signature. The first embodiment of the system 10 functions in part to separate the user's private key into at least first and second portions, each of which is authorized by the user through distinct communication channels as described in detail below.

As shown in FIG. 1, the first embodiment of the system 10 can include a first user device 12 that can include one or more of a client 14, a private key module 16, and/or a first portion of a private key 18 of the user. The first user device 12 can be any suitable type of computing device or machine, including for example a desktop or laptop computer, smart phone, tablet computer, server, server cluster, and/or any suitable combination thereof. The first user device 12 can include a client module 14 that preferably functions to interface, integrate and/or communicate with an encryption/authentication standard. As an example, the client module 14 can preferably be an SSH module, a VPN module, a TLS module, an email, SMS, MMS, or communications module, or any other suitable module configured for secure receipt and/or transmission of non-transitory digital signals. The first user device 12 can preferably include a user key module 16 that preferably functions to request, retrieve, return, store, transmit, and/or manage one or more of a user private key or a user public key.

As an example, the user key module 16 can be configured as a PKCS11 module that preferably functions to retrieve and/or return the user's public key (which can be stored locally or remotely) and/or one or more portions of the user's private key. Moreover, in alternative embodiments of the system 10 the user key module 16 can further function to generate and/or compute the user's digital signature in response to receipt of one or more of the first and second portions of the user's private key.

As shown in FIG. 1, the first embodiment of the system 10 can also include a server 20 or server system that functions to mediate the authentication procedures set forth below. The server 20 of the first embodiment of the system 10 can include a mediation module 24 and a communication module 26. The server 20 is preferably configured as a remote cloud-based service that is adapted for distributed communications and local storage of at least a second portion of the user private key 22. The mediation module 24 preferably functions to verify the status of the user's public key and to mediate and/or negotiate the creation of the digital signature from the at least two portions of the user's private key. The communication module 26 preferably functions to create and/or maintain a separate channel of communication between at least the mediation module 24 and the second user device 30. Preferably, the communication module 26 can include any necessary communication ports, protocols, software, firmware, and/or hardware to communication with any number of devices that could be the second user device 30.

As shown in FIG. 1, the second user device 30 of the first embodiment of the system 10 can include a user challenge module 32 and a user challenge channel 34. The second user device 30 preferably functions as a secondary independent communication channel to verify a user's identify apart from the first user device 12, such that a user must be in control of both the first and second user devices 12, 30 in order to be properly authenticated as described herein. For example, the second user device 30 can be any suitable portion of the first device 12 or a distinct device that is physically independent from the first device 12. Alternatively, the second user device 30 can be a desktop or laptop computer, a smart phone, a tablet, PDA, key fob, portable memory/computing device such as a programmed USB stick, or any other suitable functionally independent device. Preferably, the second user device 30 further functions to provide a user challenge to the user in order to confirm the user's identity and/or intentions relating to the authentication protocol. The user challenge module 32 can function to interface with the server 20, while the user challenge channel 34 can function to interface with the user in administering the user challenge. Upon a successful completion of a user challenge through the user challenge channel 34, preferably the user challenge module 32 of the second user device 30 notifies the communication module 26 of the server 20 of the success such that the server 20 can authorize and/or assist in the authentication of the user. Example user challenges can include one or more of SMS or MMS messages, emails, voice telephone calls, automated telephone calls, PIN requests, push notifications, one-time passwords, and the like.

In one example implementation, the first embodiment of the system 10 can function to split or divide the digital signature process by splitting or dividing the user's private key into two or more portions, each of which require independent authorization from the user in order to create the digital signature. As an example, if the user attempts to connect with the third party daemon 42 (i.e., an SSH daemon of a third party server 40), the will need to present his or her public key (either retrieved from the server 20 or stored locally at the first user device 12). Preferably, if the user's public key is valid and known to the third party in the user public key 44, then the third party 40 requests that the user provide a digital signature in order to authenticate himself or herself. As noted above, a suitable digital signature can include a function of the user's private key such an encryption of unique session data with the private key. Preferably, the user client 14 will request the users private key from the user key module 16 in response to the authentication request from the daemon 42.

As shown in FIG. 1, in the first embodiment of the system 10, the user's private key can be divided into at least two parts; a first portion of the private key 18 can be stored locally at the first user device 12 and a second portion of the private key 22 can be stored at the server 20. Accordingly, in response to a private key request from the user key module 16, the mediation module 24 preferably directs the communication module 26 to contact the second user device 30 to initiate the user challenge. As noted above, the user challenge can include any suitable mode or manner of device-based authentication, including at least requiring the user to respond to a one or more of SMS or MMS messages, emails, voice telephone calls, automated telephone calls, PIN requests, push notifications, one-time passwords, and the like. In response to a successful completion of the user challenge, the mediation module 24 preferably creates half of the digital signature (i.e., the portion of the digital signature including the second portion of the private key 22) and sends its portion of the digital signature back to the first user device 12. In response to receipt of the server 20 portion of the digital signature, the first user device 12 preferably creates its portion of the digital signature using the first private key portion 18 and combines the respective portions of the digital signature into a full digital signature for authentication to the third party 40. Preferably, the combination of the first and second portions of the digital signature does not affect the form or content of the complete digital signature, such that it will appear to the third party 40 as if the digital signature was created in full at the first user device 12.

As noted above, the first embodiment of the system 10 can be configured for operation with any number of suitable applications including at least a SSH connection, a VPN connection, a TLS connection, a secure email/voice/data connection, or any other suitable connection for which authentication is sought. In another alternative to the first embodiment of the system 10, the daemon 42 and/or the user's public key 44 can be stored and/or located on the server 20, or as part of the network or cloud structure of the server 20. In another alternative to the first embodiment of the system 10, the user key module 16 can include a modified PKCS#11 module configured for the divided private key operations described herein.

Figure 2:
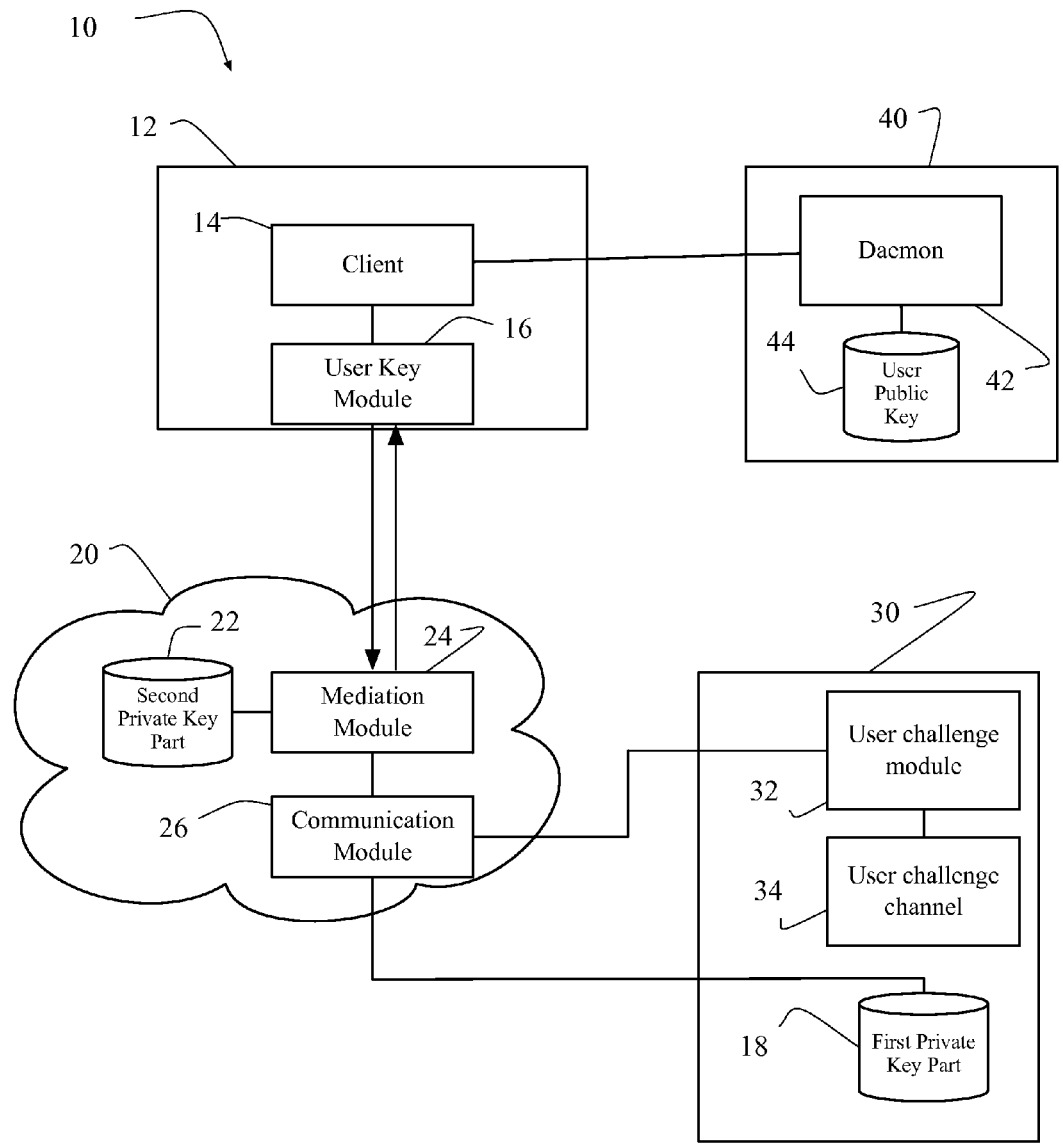
FIG. 2 is a schematic block diagram of a system and/or operating environment of digital user authentication in accordance with one or more example implementations of the present invention.

As shown in FIG. 2, a second embodiment of the system 10 can include a first user device 12, a second user device 30, a remote server 20 connecting the first user device 12 and the second user device 30, and a third party 40 to which a user is attempting to authenticate himself or herself, each of which can function substantially identically to the description with respect to FIG. 1. As shown in FIG. 2, the second embodiment of the system 10 can further include the first private key portion 18 being disposed in/on the second user device 30 as opposed to the first user device 12 as described above.

As shown in FIG. 2, the second embodiment of the system 10 can function to split or divide the digital signature process by splitting or dividing the user's private key into two or more portions, each of which require independent authorization from the user in order to create the digital signature. As noted in the example implementation above, when the user attempts to connect with the third party daemon 42 (i.e., an SSH daemon of a third party server 40), he or she will need to present her public key (either retrieved from the server 20 or stored locally at the first user device 12). Preferably, if the user's public key is valid and known to the third party in the user public key 44, then the server requests that the user provide a digital signature in order to authenticate himself or herself. As noted above, a suitable digital signature can include a function of the user's private key such an encryption of unique session data with the private key. Preferably, the user client 14 will request the users private key from the user key module 16 in response to the authentication request from the daemon 42.

As shown in FIG. 2, in the second embodiment of the system 10 the user's private key can be divided into at least two parts; a first portion of the private key 18 can be stored remotely at the second user device 30 and a second portion of the private key 22 can be stored at the server 20. Preferably, in response to a private key request from the user key module 16, the mediation module 24 directs the communication module 26 to contact the second user device 30 to initiate the user challenge. As noted above, the user challenge can include any suitable mode or manner of device-based authentication, including at least requiring the user to respond to a one or more of SMS or MMS messages, emails, voice telephone calls, automated telephone calls, PIN requests, push notifications, one-time passwords, and the like. In response to a successful completion of the user challenge, the second user device 30 preferably sends the first public key portion 18 to the mediation module 24. In response to receipt of the first public key portion 18, the mediation module 24 preferably creates the full digital signature and sends its portion of the digital signature back to the first user device 12. Preferably, the second user device 30 does not send the first public key portion 18 in the clear, but performs some form of encryption on the first public key portion 18 to ensure that it is not at risk.

Alternatively, the second user device 30 can, in response to a successful user challenge, create the first portion of the digital signature using the first public key portion 18 and direct the former to the mediation module 24. In response to receipt of the first portion of the digital signature, the mediation module 24 preferably creates its portion of the digital signature using the second private key portion 22 and combines the respective portions of the digital signature into a full digital signature for transmission to the first user device 12 and eventual authentication to the third party 40. Preferably, the combination of the first and second portions of the digital signature does not affect the form or content of the complete digital signature, such that it will appear to the third party 40 as if the digital signature was created in full at the first user device 12.

Figure 3:
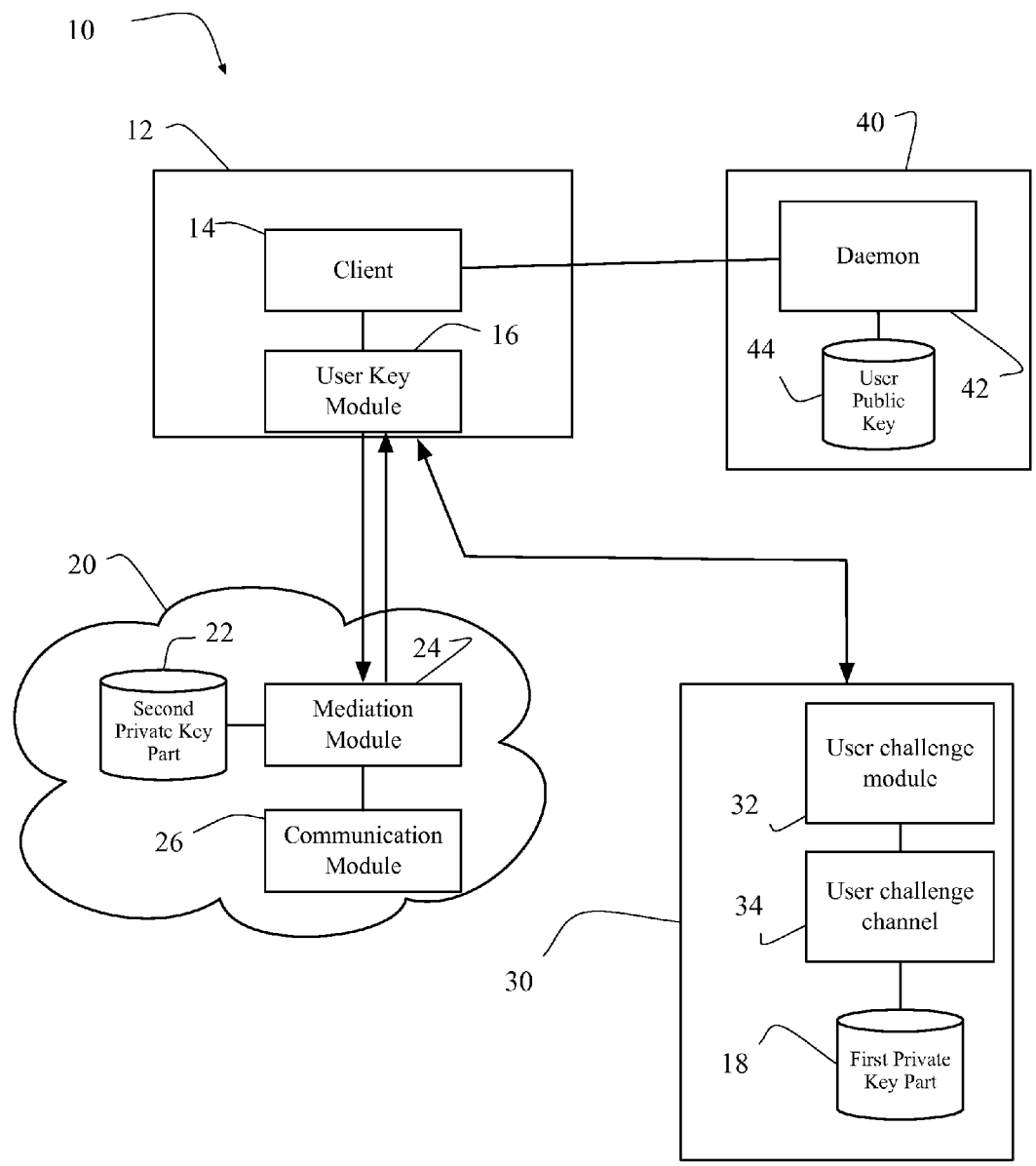
FIG. 3 is a schematic block diagram of a system and/or operating environment of digital user authentication in accordance with one or more example implementations of the present invention.

As shown in FIG. 3, a third preferred embodiment of the system 10 can also include a first user device 12, a second user device 30, a remote server 20, and a third party 40 to which a user is attempting to authenticate himself or herself, each of which can function substantially identically to the description with respect to FIGS. 1 and 2. As shown in FIG. 3, the third preferred embodiment of the system 10 can further include the first private key portion 18 being disposed in/on the second user device 30, which is in direct communication with the first user device 12 as described below.

As shown in FIG. 3, the second user device 30 is preferably connectable directly to the first user device 12, thereby eliminating or rendering moot any connection between the server 20 and the second user device 30. Preferably, the first and second user device 12, 30 can be in direct communication via a shared communication link, such as for example through a wireless near field communication (NFC) protocol, Bluetooth, a WiFi local area network, virtual private network, or any suitable combination thereof. Alternatively, the first and second user devices 12, 30 can be in direct communication through a wired or manual connection that physically connects the first and second user devices 12, 30 thereby assuring that the user is in direct control of both devices 12, 30. As an example, the user challenge itself could include plugging a smart phone second user device 30 into a USB port of the first user device 12, which could be for example a desktop or laptop computer. In such a manner, the third embodiment of the system 10 could function in an environment where the second user device 30 is unable or incapable of connecting to the server 20.

Each of the first, second, and third embodiments of the system 10 can be configured as independent implementations of the system 10. Alternatively, each of the first, second, and third embodiments of the system 10 can be configured as alternative modes of operation of a single system 10, such that for example the location of the first private key portion 18 can be varied by the system 10 and/or the user in order to alternate between modes of operation. Similarly, the second and third embodiments of the system 10 can be optional modes of operation that are contingent upon the availability and/or desirability of a connection (preferably a wireless connection) between the server 20 and the second user device 30. As such, if the second user device cannot connect to the server 20 as shown in FIG. 2, then the user can cause or elect the second user device 30 to communicate directly with the first user device 12 as shown in FIG. 3. It should also be apparent to those of skill in the art that the first and second user device 12, 30 designations are arbitrary and interchangeable and are defined and shown herein solely for purposes of this detailed description. Each of the first and second user devices 12, 30 of the system 10 can be a first or second user device to another third (not shown) user device, and each second user device could itself have its own second user device for its own authentication procedures.

2. Methods

Figure 4:
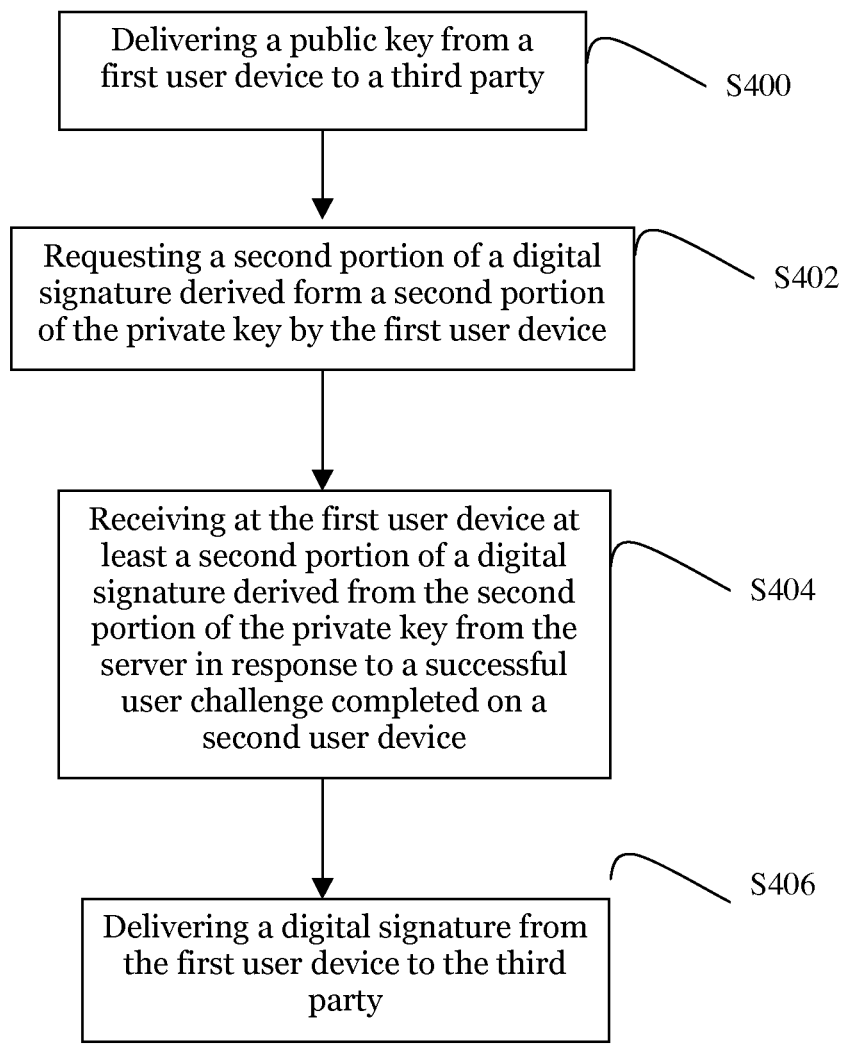
FIG. 4 is a flowchart depicting a method of digital user authentication according to a first preferred embodiment of the present invention.

As shown in FIG. 4, a first embodiment of the method of the invention can include delivering a public key from a first user device to a third party in block S400; requesting a second portion of a private key by the first user device in block S402; receiving at the first user device at least a second portion of a digital signature derived from the second portion of the private key in response to a successful user challenge completed on a second user device in block S404; and delivering a digital signature from the first user device to the third party in block S406. The first embodiment can function to can function to split or divide the digital signature process by splitting or dividing the user's private key into two or more portions, each of which require independent authorization from the user in order to create the digital signature. The first embodiment can further manage and/or implement the split-key authentication from a first user device.

As shown in FIG. 4, the first embodiment can include block S400, which recites delivering a public key from a first user device to a third party. Block S400 preferably functions to initiate or introduce a first user device to third party by transmitting a copy of the user' public key to the third party. Preferably, the first user device can be any suitable type of computing device or machine, including for example a desktop or laptop computer, smart phone, tablet computer, server, server cluster, and/or any suitable combination thereof. As noted above, the first user device can include a client module that preferably functions to interface, integrate and/or communicate with an encryption/authentication standard. As noted above, the client module can preferably be an SSH module, a VPN module, a TLS module, an email, SMS, MMS, or communications module, or any other suitable module configured for secure receipt and/or transmission of non-transitory digital signals. Preferably, if the user's public key is valid and known to the third party, then the third party requests that the user provide a digital signature in order to authenticate him or herself. As noted above, a suitable digital signature can include a function of the user's private key such an encryption of unique session data with the private key.

As shown in FIG. 4, the first embodiment can include block S402, which recites requesting a second portion of a private key by the first user device. Block S402 functions to communicate from the first user device to a remote server a request that the remote server and/or second user device return at least a second portion of the private key, or alternatively at least a second portion of a digital signature associated with and/or derived from the second portion of the private key. Preferably, the second portion of the private key is stored in/on the server, which can be configured as a cloud-based or distributed network of servers/modules/systems. A first portion of the private key can optionally be stored in/on any suitable location/device, including for example the first user device, the server or one or more aspects/modules of the server, a second user device, or any other networked device or system. Preferably, the first portion of the private key is stored in/on one or more of the first user device, the second user device, or the server.

Preferably, in response to the receipt of the request of the second portion of the private key from the first user device, the server communicates and/or requests a user challenge from a second user device. A preferred second user device can be any suitable type of computing device or machine, including for example a desktop or laptop computer, smart phone, tablet computer, server, server cluster, PDA, key fob, portable memory/computing device such as a programmed USB stick, or any other suitable functionally independent device. In one variation of the first embodiment, the second user device is physically distinct from the first user device. Alternatively, the second user device can be physically/computationally integrated with the first user device, but otherwise sandboxed or functionally distinct from the first user device such that access to the portion of the integrated device that constitutes the first user device does not automatically confer access to the portion of the integrated device that constitutes the second user device.

As shown in FIG. 4, the first embodiment can include block S404, which recites receiving at the first user device at least a second portion of a digital signature derived from a second portion of the private key in response to a successful user challenge completed on a second user device. Block S404 preferably functions to deliver the second portion of the digital signature (or both portions of the digital signature) from the server and/or the second user device to the first user device only if the user is able to successfully complete a user challenge issued on/through the second user device. As noted above, depending upon where the first portion of the private key is located/stored, the server can optionally transmit the second portion of the private key alone (preferably or alternatively encrypted), a portion of the digital signature derived from the second portion of the private key, both the first and second portions of the private key together (preferably or alternatively encrypted), both portions of the digital signature derived from the first and second portions of the private key, and/or a complete unified digital signature derived form both the first and second portions of the private key.

Preferably, the server of the first embodiment functions as a communication conduit and/or mediation module between the first user device and the second user device. As noted above, the server is preferably configured as a remote cloud-based service that is adapted for distributed communications and local storage of at least a second portion of the user private key. A mediation module of the server preferably functions to verify the status of the user's public key and to mediate and/or negotiate the creation of the digital signature from the at least two portions of the user's private key. A communication module of the server preferably functions to create and/or maintain a separate channel of communication between at least the mediation module and the second user device. Preferably, the communication module of the server can include any necessary communication ports, protocols, software, firmware, and/or hardware to communication with any number of devices that could be the second user device.

In one variation of the first embodiment, the first and second user devices can communicate through the server, which as noted above, can function as a security mediator between the first and second user devices. Preferably, each of the first and second user devices can be configured for communication across one or more communication channels and/or modes so as to be able to send/receive any suitable type of message and/or communication between the devices, including at least all of the possible types of user challenges such as one or more of SMS or MMS messages, emails, voice telephone calls, automated telephone calls, PIN requests, push notifications, one-time passwords, and the like. Preferably, at least the second user device includes telephone-SMS-email capability, thus permitting for any particular user challenge to be directed to the user through multiple channels, i.e., a data or SMS network might be operational during a down period in a voice network.

In another variation of the first embodiment, the first and second user devices can communicate directly without using a server communication channel. Alternatively, the first and second user devices can communicate directly in response to receipt of a mediation and/or authentication request from the server. As noted above, the first and second user device can preferably be in direct communication via a shared communication link, such as for example through a wireless near field communication (NFC) protocol, Bluetooth, a WiFi local area network, virtual private network, or any suitable combination thereof. Alternatively, the first and second user devices can be in direct communication through a wired or manual connection that physically connects the first and second user devices thereby assuring that the user is in direct control of both devices. As previously noted, the user challenge itself could include plugging a smart phone second user device into a USB port of the first user device, which could be for example a desktop or laptop computer. Such a user challenge would permit a user to successfully respond to a user challenge and verify control of the first and second user devices even in the event that the second user device is incapable of returning a verification and/or second portion of the private key to the server.

As shown in FIG. 4, the first embodiment can further include block S406, which recites delivering a digital signature from the first user device to the third party. Block S406 functions to complete an authentication process by transmitting and/or returning to the third party a complete digital signature that contains and/or is composed of or derived from at least in part of the first and second portions of the private key. As noted above, depending upon where the first portion of the private key is located/stored, the first user device can receive the second portion of the private key alone (preferably or alternatively encrypted), a portion of the digital signature derived from the second portion of the private key, both the first and second portions of the private key together (preferably or alternatively encrypted), both portions of the digital signature derived from the first and second portions of the private key, and/or a complete unified digital signature derived form both the first and second portions of the private key. The first user device can further be configured to create the digital signature in response to receiving one or more of the first and second portions of the private key (the first portion of the private key might be locally stored, as noted above, and the second portion of the private key can be received in an encrypted state and decrypted by the first user device). Alternatively, the first user device can be configured to create only a first portion of the digital signature from the locally stored first portion of the private key and receive the second portion of the digital signature from one of the server or the second user device. In such a case, the first user device can be further configured to combine the first and second portions of the digital signature into a unified digital signature for transmission to the third party.

Figure 5:
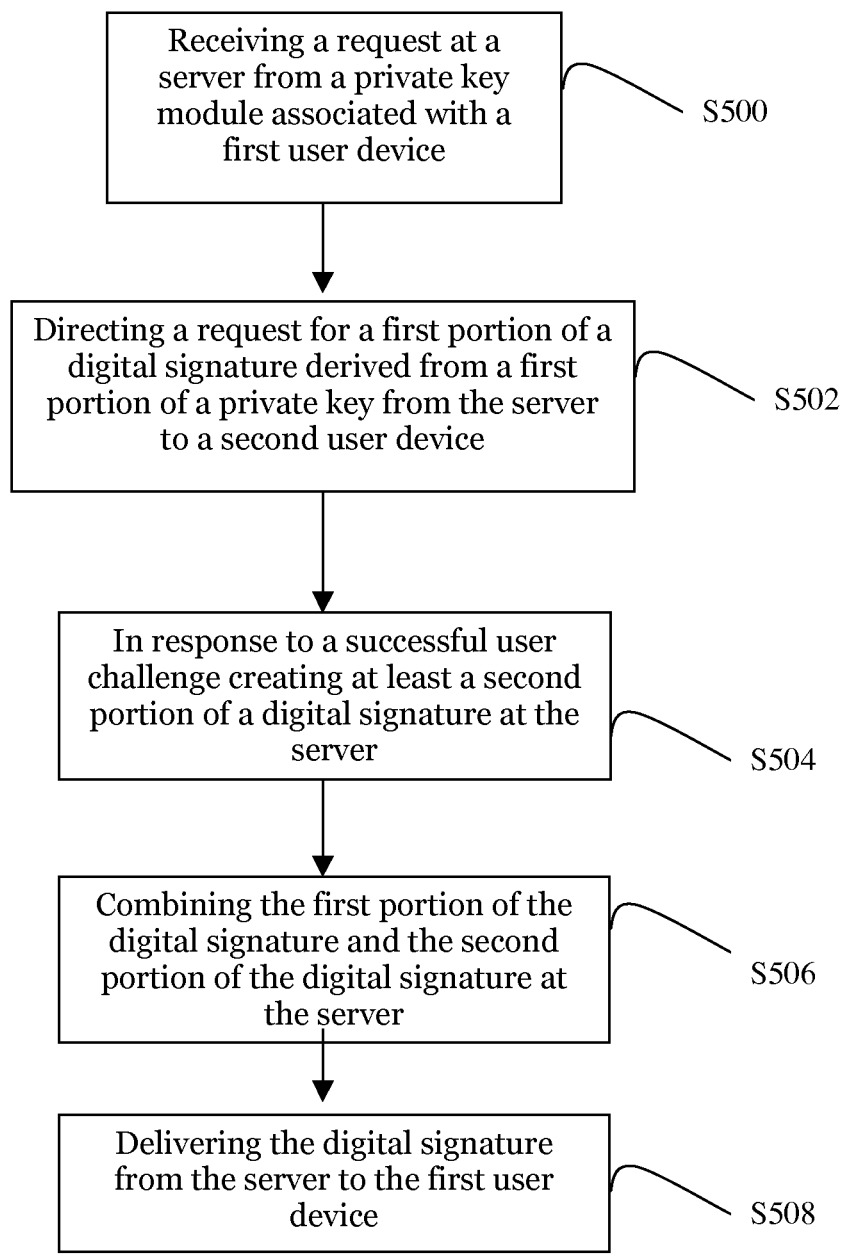
FIG. 5 is a flowchart depicting a method of digital user authentication according to a second preferred embodiment of the present invention.

As shown in FIG. 5, a second embodiment can include receiving a request at a server from a private key module associated with a first user device in block S500; directing a request for a first portion of the private key from the server to a second user device in block S502; and in response to a successful user challenge creating a first portion of a digital signature and a second portion of a digital signature at the server in block S504. The second embodiment can further include combining the first portion of the digital signature and the second portion of the digital signature in block S506; and delivering the digital signature to the first user device in block S508. The second embodiment can function secure the digital signature process by splitting or dividing the user's private key into two or more portions, each of which require independent authorization from the user in order to create the digital signature. The second embodiment can further manage and/or implement the split-key authentication from a server, which as noted herein, can include a cloud-based and/or distributed computing system.

As shown in FIG. 5, the second embodiment can include block S500, which recites receiving a request at a server from a private key module associated with a first user device. Block S500 preferably functions to initiate a server-based key mediation between a first and second user device. A preferred server can be configured as a remote cloud-based service that is adapted for distributed communications and local storage of at least a second portion of the user private key. The mediation module of the server preferably functions to verify the status of the user's public key and to mediate and/or negotiate the creation of the digital signature from the at least two portions of the user's private key. The communication module of the server preferably functions to create and/or maintain a separate channel of communication between at least the mediation module and the second user device. Preferably, the communication module of the server can include any necessary communication ports, protocols, software, firmware, and/or hardware to communication with any number of devices that could be the second user device. A preferred first user device can be any suitable type of computing device or machine, including for example a desktop or laptop computer, smart phone, tablet computer, server, server cluster, and/or any suitable combination thereof. A preferred second user device can be any suitable type of computing device or machine, including for example a desktop or laptop computer, smart phone, tablet computer, server, server cluster, PDA, key fob, portable memory/computing device such as a programmed USB stick, or any other suitable functionally independent device.

As shown in FIG. 5, the second embodiment can further include block S502, which recites directing a request for a first portion of the private key from the server to the second user device. Block S502 preferably functions to invite a second user device to initiate a user challenge for the user to complete. As noted above, in one variation of the second embodiment, the first portion of the private key can be stored and/or located in/on the first user device or the server, in which case block S502 can function to request and/or initiate the user challenge at the second user device in order to access the first portion of the private key. As noted above, preferably the second user device is physically distinct from the first user device. Alternatively, the second user device can be physically/computationally integrated with the first user device, but otherwise sandboxed or functionally distinct from the first user device such that access to the portion of the integrated device that constitutes the first user device does not automatically confer access to the portion of the integrated device that constitutes the second user device.

As shown in FIG. 5, the second embodiment can also include block S504, which recites in response to a successful user challenge creating a first portion of a digital signature and a second portion of a digital signature at the server. Block S504 preferably functions to consolidate and/or manage the creation of the first and second portions of the digital signature at the server. Alternatively, the server can be configured to create only the second portion of the digital signature at the server, and receive the first portion of the digital signature from either the first or second user device (depending upon the initial location of the first portion of the private key). As noted above, depending upon the location of the first portion of the private key, the server can optionally transmit the second portion of the private key alone (preferably or alternatively encrypted), a portion of the digital signature derived from the second portion of the private key, both the first and second portions of the private key together (preferably or alternatively encrypted), both portions of the digital signature derived from the first and second portions of the private key, and/or a complete unified digital signature derived form both the first and second portions of the private key.

As shown in FIG. 5, the second embodiment can further include block S506, which recites combining the first portion of the digital signature and the second portion of the digital signature. Block S506 preferably functions to consolidate and/or manage the creation of the first and second portions of the digital signature at the server. Alternatively, the combination of the first and second portions of the digital signature can occur at one or more of the first or second user devices in addition to or in lieu of the server. As an example, the server can be configured to create and/or transmit only a second portion of the digital signature to the user device on which the first portion of the private key (and the first portion of the digital signature) resides, in which case any subsequent combination can be performed at that user device. Preferably, the first portion of the private key and/or the first portion of the digital signature is transmitted to and received at the server (where the second portion of the private key and the second portion of the digital signature preferably reside) for combination as described above.

As shown in FIG. 5, the second embodiment can further include block S508, which recites delivering the digital signature to the first user device. Block S508 preferably functions to complete the server-managed key mediation by delivering the full digital signature to the first user device for subsequent delivery to the third party for authentication. As noted above, if the first portion of the private key is located in/on the first user device, then block S508 can function to deliver only a second portion of the digital signature (associated with the second portion of the private key) to the first user device. In such an alternative to the second embodiment, the first user device can preferably create the first portion of the digital signature, combine the first portion of the digital signature with the received second portion of the digital signature, and deliver the complete digital signature to the third party for authentication. In another alternative, the first portion of the private key can be located in/on the second user device, in which case block S508 can function to deliver only a second portion of the digital signature (associated with and/or derived from the second portion of the private key) to the second user device. In this alternative to the second embodiment, the second user device can preferably create the first portion of the digital signature, combine the first portion of the digital signature with the received digital signature, and deliver the complete digital signature to one of the server or the first user device for eventual submission to the third party. In the event that the server receives one or both of the first portion of the private key and/or first portion of the digital signature from either of the first or second user devices, then the server can preferably be configured to deliver the digital signature to the first user device as shown in block S508.

In another variation of the second embodiment, the first and second user devices can communicate directly without using a server communication channel. Alternatively, the first and second user devices can communicate directly in response to receipt of a mediation and/or authentication request from the server. As noted above, the first and second user device can preferably be in direct communication via a shared communication link, such as for example through a wireless near field communication (NFC) protocol, Bluetooth, a WiFi local area network, virtual private network, or any suitable combination thereof. Alternatively, the first and second user devices can be in direct communication through a wired or manual connection that physically connects the first and second user devices thereby assuring that the user is in direct control of both devices. As previously noted, the user challenge itself could include plugging a smart phone second user device into a USB port of the first user device, which could be for example a desktop or laptop computer. Such a user challenge would permit a user to successfully respond to a user challenge and verify control of the first and second user devices even in the event that the second user device is incapable of returning a verification and/or second portion of the private key to the server.

As described above, the system and methods of the preferred embodiment can be readily modified for other forms of encryption, such as for example in an S/MIME-encrypted email. Typically, S/MIME encryption is applied to a message with a random symmetric key that is encrypted with a public key of the email recipient. In such a manner, the recipient's email client can use a PKCS#11 (or any other suitable module) to present the encrypted symmetric key to the mediation module, at which time the intent of the user can be verified according to the systems and methods of the preferred embodiment. In response to a successful user challenge, the mediation module can decrypt the symmetric key and transmit it back to the recipient's PKCS#11 module for decrypting the received email. It should be apparent to those of skill in the art that other applications of the principles described herein can easily contrived for use in any other suitable form of digital authentication and cryptography.

The systems and methods of the preferred embodiment can be embodied and/or implemented at least in part as a machine including at least in part a computer-readable medium storing computer-readable instructions. The instructions are preferably executed by computer-executable components preferably integrated with the first user device 12, the server 20, the second user device 30, the third party 40 and/or any portions or modules thereof. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method of digital user authentication comprising:
receiving a request at a server from a private key module associated with a first user device;
directing a request for a user challenge from the server to a second user device, wherein the second user device is a smartphone or a tablet, wherein successful completion of the user challenge is required to access a first portion of a private key; and
in response to a successful user challenge completed on the second user device, creating at least a second portion of a digital signature associated with a second portion of the private key at the server to authenticate the user to a third party.

2. The method of claim 1, wherein the first user device and the second user device are distinct user devices.

3. The method of claim 1, wherein the second portion of the private key is located on the server.

4. The method of claim 3, wherein the first portion of the private key is located on the first user device.

5. The method of claim 3, wherein the first portion of the private key is located on the second user device.

6. The method of claim 1, wherein the first and second user devices communicate though the server.

7. The method of claim 1, wherein the first and second user devices communicate directly.

8. The method of claim 7, wherein the first and second user devices are connectable through a near field communication protocol.

9. The method of claim 7, wherein the first and second user devices are connectable through a wired connector.

10. The method of claim 1, further comprising creating a first portion of the digital signature at the server and combining the first portion of the digital signature and the second portion of the digital signature.

11. The method of claim 10, further comprising delivering the digital signature to the first user device.

12. The method of claim 1, wherein the private key is a portion of an asymmetric key pair having an encryption portion and a decryption portion; wherein the private key is the encryption portion of the asymmetric key pair.

13. The method of claim 1, wherein the successful user challenge is performed by a user responding directly to a prompt, the prompt displayed on an electronic display of the second user device, using a touchscreen of the second user device.

14. A method of digital user authentication comprising:
delivering a public key from a first user device to a third party;
generating a first portion of a digital signature, the first portion derived from a first portion of a private key, on the first user device;

requesting a second portion of a digital signature, the second portion derived from a second portion of the private key by the first user device;

receiving at the first user device at least a second portion of a digital signature derived from the second portion of the private key in response to a successful user challenge completed on a second user device, wherein the second user device is a smartphone or a tablet; and delivering a digital signature from the first user device to the third party.

15. The method of claim 14, further comprising storing the first portion of the private key on the first user device.

16. The method of claim 14, further comprising receiving the second portion of the digital signature from the server in response to a successful user challenge completed on the second user device.

17. The method of claim 14, further comprising receiving the second portion of the digital signature from the second user device.

18. The method of claim 14, further comprising receiving the complete digital signature at the first user device from one of the server or the second user device.

19. The method of claim 14, wherein the first user device and the second user device are connectable through a near field communication protocol.

20. The method of claim 14, wherein the first and second user devices are connectable through a wired connector.

21. The method of claim 14, wherein the private key is a portion of an asymmetric key pair having an encryption portion and a decryption portion; wherein the private key is the encryption portion of the asymmetric key pair.

22. The method of claim 14, wherein the successful user challenge is performed by a user responding directly to a prompt, the prompt displayed on an electronic display of the second user device, using a touchscreen of the second user device.

23. A method of digital user authentication comprising:

receiving a request at a server from a private key module associated with a first user device;

directing a request for a first portion of a digital signature derived from a first portion of a private key from the server to a second user device; wherein the second user device is a smartphone or tablet;

in response to a successful user challenge completed on the second device, creating at least a second portion of a digital signature derived from a second portion of the private key at the server;

combining the first portion of the digital signature and the second portion of the digital signature at the server; and delivering the digital signature from the server to the first user device.

24. The method of claim 23, wherein the first user device and the second user device are distinct user devices.

25. The method of claim 23, wherein the first user device and the second user device are connectable through a near field communication protocol.

26. The method of claim 23, wherein the first and second user devices are connectable through a wired connector.

27. The method of claim 23, wherein the private key is a portion of an asymmetric key pair having an encryption portion and a decryption portion; wherein the private key is the encryption portion of the asymmetric key pair.

28. The method of claim 23, wherein the successful user challenge is performed by a user responding directly to a prompt, the prompt displayed on an electronic display of the second user device, using a touchscreen of the second user device.

* * * * *